(12) United States Patent
Masuda et al.

(10) Patent No.: US 10,690,867 B1
(45) Date of Patent: Jun. 23, 2020

(54) OPTICAL DEVICE WITH ADHESIVE CONNECTION OF RECESS OR SIDE PROTRUSION

(71) Applicant: INTERNATIONAL BUSINESS MACHINES CORPORATION, Armonk, NY (US)

(72) Inventors: Koji Masuda, Tokyo (JP); Patrick Jacques, Hubert (CA); Paul Francis Fortier, Richelieu (CA); Masao Tokunari, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/273,395

(22) Filed: Feb. 12, 2019

(51) Int. Cl.
*G02B 6/42* (2006.01)
*G02B 6/12* (2006.01)
*G02B 3/00* (2006.01)

(52) U.S. Cl.
CPC ......... *G02B 6/4257* (2013.01); *G02B 3/0006* (2013.01); *G02B 6/12004* (2013.01); *G02B 6/4204* (2013.01); *G02B 2006/12102* (2013.01); *G02B 2006/12104* (2013.01)

(58) Field of Classification Search
CPC .................................................. G02B 6/4257; G02B 6/12004; G02B 6/4204; G02B 3/0006; G02B 2006/12102; G02B 2006/12104
See application file for complete search history.

(56) References Cited

U.S. PATENT DOCUMENTS

| | | | | |
|---|---|---|---|---|
| 3,620,260 | A | * 11/1971 | Claude Bourlet | D03J 1/223 139/292 |
| 4,021,637 | A | * 5/1977 | DeHaeck | B23K 35/3053 219/145.22 |
| 4,328,405 | A | * 5/1982 | Cuneo | H01H 13/08 200/243 |
| 5,732,656 | A | * 3/1998 | Tran | A01K 63/006 119/254 |

(Continued)

FOREIGN PATENT DOCUMENTS

EP 2581776 A1 4/2013

OTHER PUBLICATIONS

Barwicz, "Enabling Large-Scale Deployment of Photonics Through Cost-Efficient and Scalable Packaging", 2015 IEEE International Conference on Group IV Photonics, Oct. 2015, pp. 155-156.

(Continued)

*Primary Examiner* — Andrew Jordan
(74) *Attorney, Agent, or Firm* — Tutunjian & Bitetto, P.C.; Vazken Alexanian

(57) ABSTRACT

An optical device includes a substrate including plural waveguide cores and an optical component provided on the substrate. The plural waveguide cores allowing light to pass through the plural waveguide cores and the optical component including plural lenses Each of the plural lenses transmitting light passing through a corresponding one of the plural waveguide cores on the substrate, wherein the optical component includes a body and a protrusion The body being provided with the plural lenses, the protrusion being protruded from a side of the body, and the protrusion is fixed to the substrate with an adhesive.

25 Claims, 14 Drawing Sheets

(56) References Cited

U.S. PATENT DOCUMENTS

| | | | | |
|---|---|---|---|---|
| 5,819,650 | A * | 10/1998 | Shih | B41K 1/12 |
| | | | | 101/111 |
| 6,085,967 | A | 7/2000 | Grande et al. | |
| 6,652,159 | B2 * | 11/2003 | Chan | G02B 6/4201 |
| | | | | 385/92 |
| 6,708,839 | B2 * | 3/2004 | Diesterbeck | B65D 1/46 |
| | | | | 206/508 |
| 6,731,853 | B2 * | 5/2004 | Boudreau | G02B 6/3636 |
| | | | | 385/137 |
| 6,910,812 | B2 | 6/2005 | Pommer et al. | |
| 6,934,429 | B2 * | 8/2005 | Kikuchi | G02B 6/42 |
| | | | | 385/129 |
| 7,086,134 | B2 * | 8/2006 | Dautartas | G02B 6/4204 |
| | | | | 228/180.22 |
| 7,221,829 | B2 * | 5/2007 | Oono | G02B 6/4201 |
| | | | | 385/52 |
| 7,271,461 | B2 * | 9/2007 | Dutta | G02B 6/12002 |
| | | | | 257/432 |
| 7,290,321 | B2 * | 11/2007 | Steinberg | G02B 6/4204 |
| | | | | 228/180.22 |
| 7,340,279 | B2 * | 3/2008 | Chen | H04B 7/0491 |
| | | | | 342/158 |
| 7,449,674 | B2 * | 11/2008 | Ueno | G02B 6/423 |
| | | | | 250/227.11 |
| 7,505,650 | B1 | 3/2009 | Grzybowski et al. | |
| 7,553,088 | B2 * | 6/2009 | Nakajima | G02B 6/32 |
| | | | | 385/64 |
| 7,642,645 | B2 | 1/2010 | Daniel et al. | |
| 7,851,811 | B2 * | 12/2010 | Dutta | G02B 6/12002 |
| | | | | 257/84 |
| 7,851,816 | B2 * | 12/2010 | Dutta | G02B 6/12002 |
| | | | | 257/98 |
| 7,894,691 | B2 * | 2/2011 | Ikeda | B29C 66/1122 |
| | | | | 385/14 |
| 7,922,514 | B2 | 4/2011 | Liao | |
| 7,923,273 | B2 * | 4/2011 | Dutta | G02B 6/12002 |
| | | | | 438/29 |
| 8,111,730 | B2 * | 2/2012 | Budd | G02B 6/4201 |
| | | | | 372/36 |
| 8,290,008 | B2 * | 10/2012 | Andry | G02B 6/4204 |
| | | | | 257/690 |
| 8,319,230 | B1 * | 11/2012 | Dutta | G02B 6/12002 |
| | | | | 257/82 |
| 8,411,719 | B2 * | 4/2013 | Budd | G02B 6/4201 |
| | | | | 372/34 |
| 8,483,253 | B2 * | 7/2013 | Budd | G02B 6/4201 |
| | | | | 372/34 |
| 8,559,474 | B2 * | 10/2013 | Andry | G02B 6/4204 |
| | | | | 257/690 |
| 8,585,300 | B2 | 11/2013 | Buijs et al. | |
| 8,766,284 | B1 * | 7/2014 | Dutta | G02B 6/12002 |
| | | | | 257/82 |
| 8,971,678 | B2 * | 3/2015 | Nakano | G02B 6/4236 |
| | | | | 385/14 |
| 9,229,169 | B2 * | 1/2016 | Doany | G02B 6/32 |
| 9,246,592 | B2 * | 1/2016 | Budd | H04B 10/40 |
| 9,341,773 | B2 | 5/2016 | Dutta | |
| 9,341,797 | B2 * | 5/2016 | Nakagawa | G02B 6/43 |
| 9,354,408 | B2 * | 5/2016 | Noma | G02B 6/122 |
| 9,360,644 | B2 * | 6/2016 | Fasano | G02B 6/122 |
| 9,372,305 | B2 * | 6/2016 | Numata | G02B 6/4292 |
| 9,429,711 | B2 | 8/2016 | Nakagawa et al. | |
| 9,470,855 | B1 * | 10/2016 | Shubin | G02B 6/4228 |
| 9,470,858 | B2 * | 10/2016 | Houbertz-Krauss | |
| | | | | G02B 6/4206 |
| 9,519,105 | B1 | 12/2016 | Shubin et al. | |
| 9,551,848 | B1 * | 1/2017 | Dutta | G02B 6/12002 |
| 9,568,679 | B2 * | 2/2017 | Doany | G02B 6/4204 |
| 9,632,265 | B2 * | 4/2017 | Nekado | G02B 6/421 |
| 9,656,420 | B2 * | 5/2017 | Barwicz | B29O 65/7847 |
| 9,658,411 | B2 * | 5/2017 | Numata | G02B 6/4292 |
| 9,658,415 | B2 * | 5/2017 | Budd | H04B 10/40 |
| 9,662,830 | B2 * | 5/2017 | Barwicz | B29O 65/7847 |
| 9,671,578 | B2 * | 6/2017 | Budd | H04B 10/40 |
| 9,720,174 | B2 | 8/2017 | Houbertz et al. | |
| 9,720,190 | B2 * | 8/2017 | Nakagawa | G02B 6/43 |
| 9,721,812 | B2 * | 8/2017 | Horibe | G02B 6/4214 |
| 9,726,824 | B1 | 8/2017 | Berger et al. | |
| 9,726,826 | B2 * | 8/2017 | Ooi | G02B 6/322 |
| 9,772,462 | B2 * | 9/2017 | Noma | G02B 6/122 |
| 9,817,192 | B2 * | 11/2017 | Nekado | G02B 6/421 |
| 9,829,204 | B2 * | 11/2017 | Oohigashi | F24H 8/00 |
| 9,835,797 | B1 * | 12/2017 | Dutta | G02B 6/12002 |
| 9,952,392 | B2 * | 4/2018 | Nakagawa | G02B 6/43 |
| 9,958,625 | B2 * | 5/2018 | Budd | H04B 10/40 |
| 9,977,191 | B2 * | 5/2018 | Nakagawa | G02B 3/0006 |
| 9,989,713 | B1 * | 6/2018 | Cyr | G02B 6/4239 |
| 10,025,044 | B1 * | 7/2018 | Masuda | G02B 6/4245 |
| 10,048,439 | B1 * | 8/2018 | Dutta | H05K 1/181 |
| 10,175,432 | B2 * | 1/2019 | Tateyama | G02B 6/264 |
| 10,191,218 | B2 | 1/2019 | Wada | |
| 10,254,476 | B1 * | 4/2019 | Dutta | G02B 6/12002 |
| 10,365,431 | B2 * | 7/2019 | Heroux | G02B 6/4245 |
| 10,371,907 | B2 * | 8/2019 | Cyr | G02B 6/4238 |
| 10,539,752 | B2 * | 1/2020 | Masuda | G02B 6/4214 |
| 2002/0084565 | A1 | 7/2002 | Dautartas et al. | |
| 2002/0131752 | A1 | 9/2002 | Boudreau et al. | |
| 2002/0137538 | A1 * | 9/2002 | Chen | H04B 7/0491 |
| | | | | 455/575.7 |
| 2002/0175174 | A1 * | 11/2002 | Diesterbeck | B65D 1/46 |
| | | | | 220/782 |
| 2003/0002824 | A1 * | 1/2003 | Chan | G02B 6/4201 |
| | | | | 385/92 |
| 2003/0201462 | A1 | 10/2003 | Pommer et al. | |
| 2004/0052494 | A1 | 3/2004 | Kobayashi | |
| 2004/0184737 | A1 | 9/2004 | Oono et al. | |
| 2005/0224946 | A1 * | 10/2005 | Dutta | G02B 6/12002 |
| | | | | 257/686 |
| 2006/0068629 | A1 | 3/2006 | Nakajima | |
| 2006/0070226 | A1 * | 4/2006 | Daniel | B23Q 3/18 |
| | | | | 29/464 |
| 2006/0272149 | A1 * | 12/2006 | Steinberg | G02B 6/4204 |
| | | | | 29/834 |
| 2007/0267569 | A1 | 11/2007 | Ueno et al. | |
| 2009/0310907 | A1 * | 12/2009 | Ikeda | B29O 65/76 |
| | | | | 385/14 |
| 2010/0027577 | A1 * | 2/2010 | Dutta | G02B 6/12002 |
| | | | | 372/50.1 |
| 2010/0027946 | A1 * | 2/2010 | Dutta | G02B 6/12002 |
| | | | | 385/88 |
| 2010/0027947 | A1 * | 2/2010 | Dutta | G02B 6/12002 |
| | | | | 385/88 |
| 2010/0130047 | A1 * | 5/2010 | Liao | H01R 13/22 |
| | | | | 439/296 |
| 2011/0044367 | A1 * | 2/2011 | Budd | G02B 6/4201 |
| | | | | 372/50.21 |
| 2011/0044369 | A1 * | 2/2011 | Andry | G02B 6/4204 |
| | | | | 372/50.124 |
| 2012/0120976 | A1 * | 5/2012 | Budd | G02B 6/4201 |
| | | | | 372/34 |
| 2012/0120978 | A1 * | 5/2012 | Budd | G02B 6/4201 |
| | | | | 372/50.21 |
| 2012/0201499 | A1 * | 8/2012 | Buijs | G02B 6/00 |
| | | | | 385/78 |
| 2012/0326290 | A1 * | 12/2012 | Andry | G02B 6/4204 |
| | | | | 257/680 |
| 2013/0084039 | A1 | 4/2013 | Doany et al. | |
| 2013/0301986 | A1 * | 11/2013 | Nakano | G02B 6/4236 |
| | | | | 385/31 |
| 2014/0112629 | A1 * | 4/2014 | Numata | G02B 6/4292 |
| | | | | 385/97 |
| 2014/0174382 | A1 * | 6/2014 | Oohigashi | F24H 8/00 |
| | | | | 122/18.4 |
| 2014/0254985 | A1 * | 9/2014 | Lai | G02B 6/4204 |
| | | | | 385/33 |
| 2015/0050028 | A1 * | 2/2015 | Budd | H04B 10/40 |
| | | | | 398/135 |
| 2015/0104129 | A1 * | 4/2015 | Nakagawa | G02B 6/43 |
| | | | | 385/14 |

(56) References Cited

U.S. PATENT DOCUMENTS

| | | | | |
|---|---|---|---|---|
| 2015/0277066 | A1* | 10/2015 | Nakagawa | G02B 3/0006 385/33 |
| 2015/0293305 | A1* | 10/2015 | Nakagawa | G02B 3/0006 29/428 |
| 2015/0331206 | A1* | 11/2015 | Dutta | G02B 6/12002 385/14 |
| 2015/0338587 | A1* | 11/2015 | Houbertz-Krauss | G02B 6/4206 385/92 |
| 2015/0338589 | A1* | 11/2015 | Noma | G02B 6/122 385/14 |
| 2016/0070061 | A1* | 3/2016 | Fasano | G02B 6/122 385/14 |
| 2016/0116691 | A1* | 4/2016 | Budd | H04B 10/40 385/14 |
| 2016/0116692 | A1* | 4/2016 | Budd | H04B 10/40 216/24 |
| 2016/0116695 | A1 | 4/2016 | Nekado et al. | |
| 2016/0209596 | A1 | 7/2016 | Ooi et al. | |
| 2016/0209608 | A1* | 7/2016 | Nakagawa | G02B 6/43 |
| 2016/0246017 | A1* | 8/2016 | Noma | G02B 6/122 |
| 2016/0252686 | A1* | 9/2016 | Numata | G02B 6/4292 385/50 |
| 2016/0318240 | A1* | 11/2016 | Barwicz | B29O 65/7847 |
| 2016/0318241 | A1* | 11/2016 | Barwicz | B29O 65/7847 |
| 2017/0003453 | A1* | 1/2017 | Doany | H01L 21/302 |
| 2017/0075066 | A1* | 3/2017 | Houbertz | G02B 6/4206 |
| 2017/0146741 | A1* | 5/2017 | Horibe | G02B 6/4214 |
| 2017/0148646 | A1 | 5/2017 | Horibe et al. | |
| 2017/0192177 | A1* | 7/2017 | Nekado | G02B 6/421 |
| 2017/0199343 | A1* | 7/2017 | Nakagawa | G02B 6/43 |
| 2017/0261706 | A1* | 9/2017 | Budd | H04B 10/40 |
| 2017/0322382 | A1 | 11/2017 | Tateyama | |
| 2018/0106965 | A1* | 4/2018 | Heroux | G02B 6/12004 |
| 2018/0203193 | A1* | 7/2018 | Masuda | G02B 6/4245 |
| 2018/0259728 | A1* | 9/2018 | Cyr | G02B 6/4239 |
| 2018/0259729 | A1* | 9/2018 | Cyr | G02B 6/4239 |
| 2018/0267264 | A1* | 9/2018 | Masuda | G02B 6/12004 |
| 2018/0335571 | A1 | 11/2018 | Wada | |
| 2018/0335579 | A1 | 11/2018 | Wada | |

OTHER PUBLICATIONS

U.S. Office Action issued in U.S. Appl. No. 16/210,630, dated Sep. 5, 2019, 18 pages.

Masuda, K. et al., "High Density Micro-lens Array Connector for Optical Multi-chip Module" 2016 IEEE 66th Electronic Components and Technology Conference (May 2016) pp. 2317-2322.

Offrein, B.J. et al., "High bandwidth board-level parallel optical interconnects for server applications" ECOC (Sep. 2006) pp. 1-37.

Tokunari, M. et al., "High-Bandwidth Density and Low-Power Optical MCM Using Waveguide-Integrated Organic Substrate" Journal of Lightwave Technology (Mar. 2014) pp. 1207-1212, vol. 32, No. 6.

Tokunari, M. et al., "Assembly and Demonstration of High Bandwidth-Density Optical MCM" IEEE 2015 Electronic Components & Technology Conference (May 2015) pp. 799-803.

U.S. Final Office Action issued in U.S. Appl. No. 16/210,630, dated Jan. 15, 2020, 19 pages.

\* cited by examiner

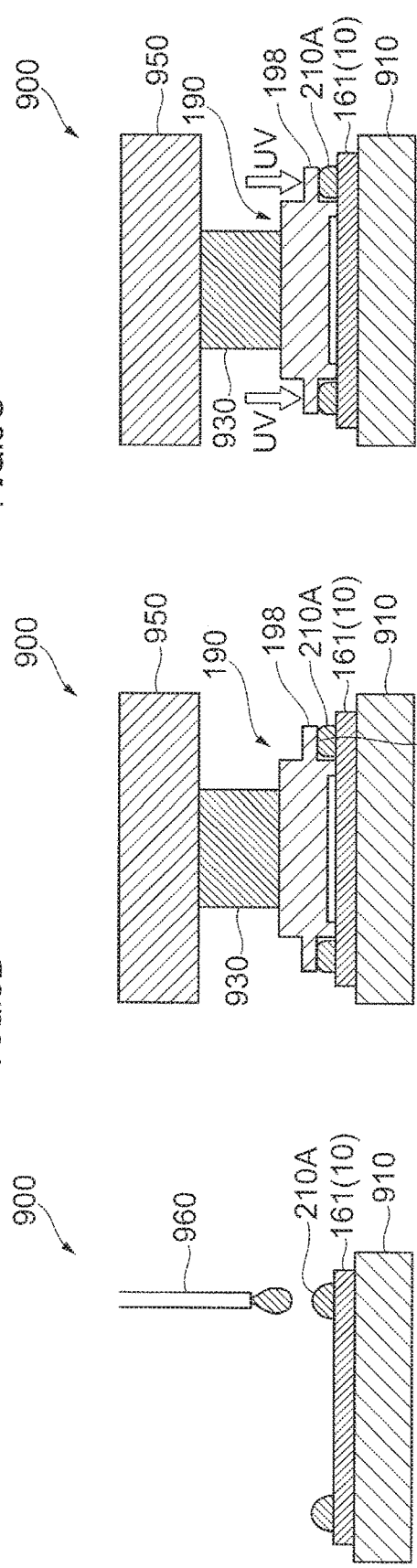

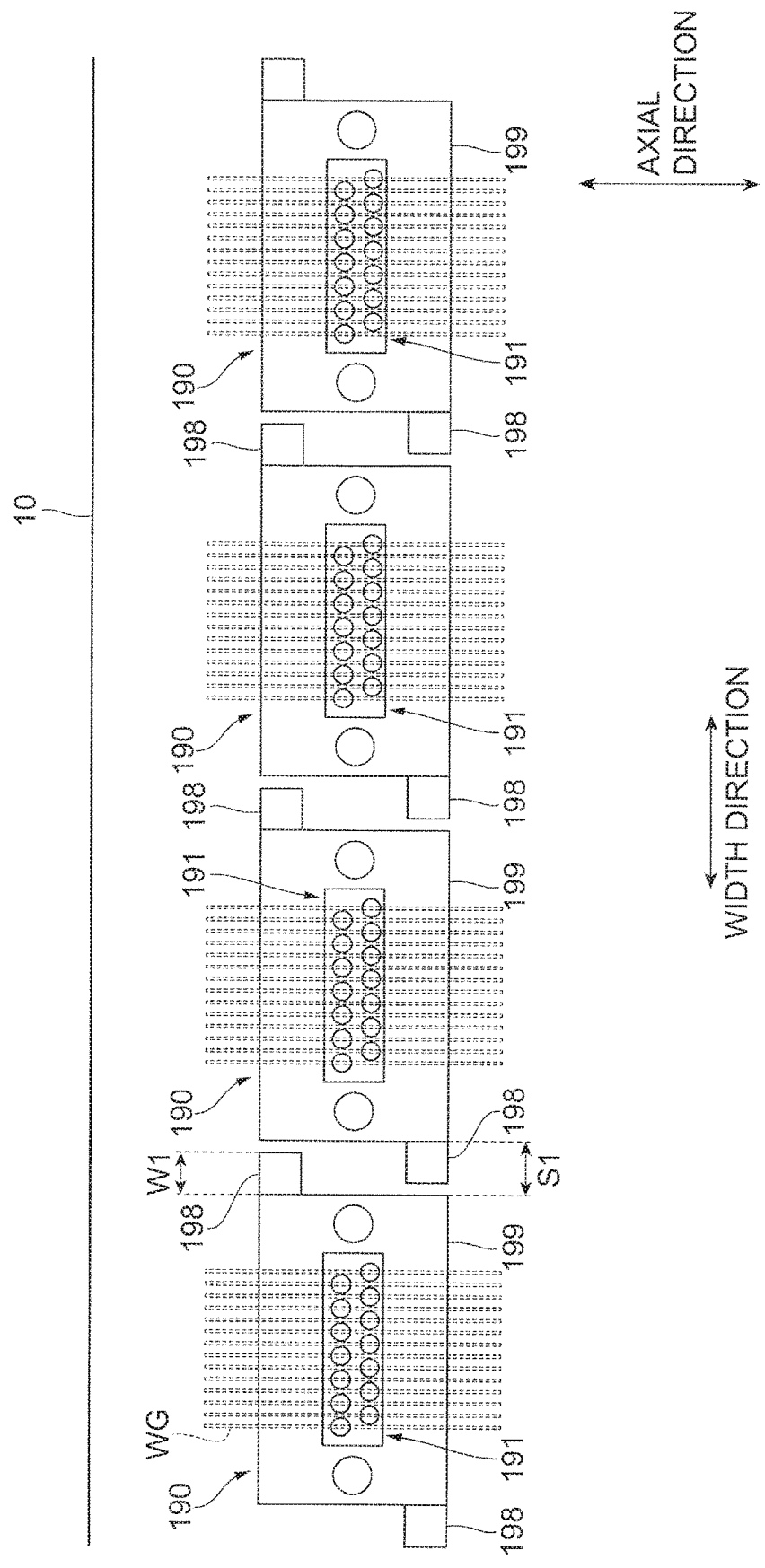

OPTICAL DEVICE WITH ADHESIVE CONNECTION OF RECESS OR SIDE PROTRUSION

BACKGROUND

The present invention relates to a microlens array assembling process, and more particularly to a fixation process for fixing an optical component having a microlens array to a substrate.

SUMMARY

According to an embodiment of the present invention, there is provided an optical device. The optical device includes a substrate including plural waveguide cores allowing light to pass through the plural waveguide cores. The optical device further includes an optical component provided on the substrate. The optical component includes plural lenses each transmitting light passing through a corresponding one of the plural waveguide cores on the substrate. The optical component includes a body and a protrusion. The body being provided with the plural lenses and the protrusion being protruded from a side of the body. The protrusion is fixed to the substrate with an adhesive.

According to another embodiment of the present invention, there is provided an optical device. The optical device includes a substrate including plural waveguide cores allowing light to pass through the plural waveguide cores. The optical device further includes an optical component provided on the substrate. The optical components include plural lenses each transmitting light passing through a corresponding one of the plural waveguide cores on the substrate. The optical component includes a surface facing the substrate and recesses provided on the surface. The recesses face each other across the plural lenses. The optical component is fixed to the substrate by adhesives accommodated in the recesses.

According to still another embodiment of the present invention, there is provided a device including an optical device and an operating unit operating based on a signal from the optical device. The optical device includes a substrate including plural waveguide cores allowing light to pass through the plural waveguide cores. The optical device further includes an optical component provided on the substrate. The optical component including plural lenses each transmitting light passing through a corresponding one of the plural waveguide cores on the substrate. The optical component includes a body and a protrusion. The body being provided with the plural lenses and the protrusion being protruded from a side of the body. The protrusion is fixed to the substrate with an adhesive.

According to still another embodiment of the present invention, there is provided a method for fabricating an optical device. The method includes forming a substrate and an optical component. The substrate includes plural waveguide cores allowing light to pass through the plural waveguide cores. The optical component is provided on the substrate and includes plural lenses each transmitting light passing through a corresponding one of the plural waveguide cores on the substrate. The optical component includes a body and a protrusion. The body being provided with the plural lenses and the protrusion being protruded from a side of the body. The method further includes fixing the protrusion to the substrate with an adhesive.

According to still another embodiment of the present invention, there is provided a method for fabricating a device. The method includes forming a substrate, an optical component and a device body. The substrate includes plural waveguide cores allowing light to pass through the plural waveguide cores. The optical component is provided on the substrate and includes plural lenses each transmitting light passing through a corresponding one of the plural waveguide cores on the substrate. The optical component includes a body and a protrusion. The body being provided with the plural lenses and the protrusion being protruded from a side of the body. The method further includes fixing the protrusion to the substrate with an adhesive. The method further includes mounting the optical component fixed to the substrate to the device body.

BRIEF DESCRIPTION OF THE DRAWINGS

FIGS. 8A, 8B, 8C, 8D, and 8E show a process for fixing the substrate side component to the waveguide layer in the first embodiment.

FIG. 9 is a top view of the substrate side components arranged on the main substrate according to the first embodiment.

DETAILED DESCRIPTION

Hereinafter, exemplary embodiments of the present invention will be described in detail with reference to the attached drawings.

It is to be noted that the present invention is not limited to the exemplary embodiments given below and may be implemented with various modifications within the scope of the present invention.

In addition, the drawings used herein are for purposes of illustration, and may not show actual dimensions.

First Embodiment (Communication System 1)

Figure 1:
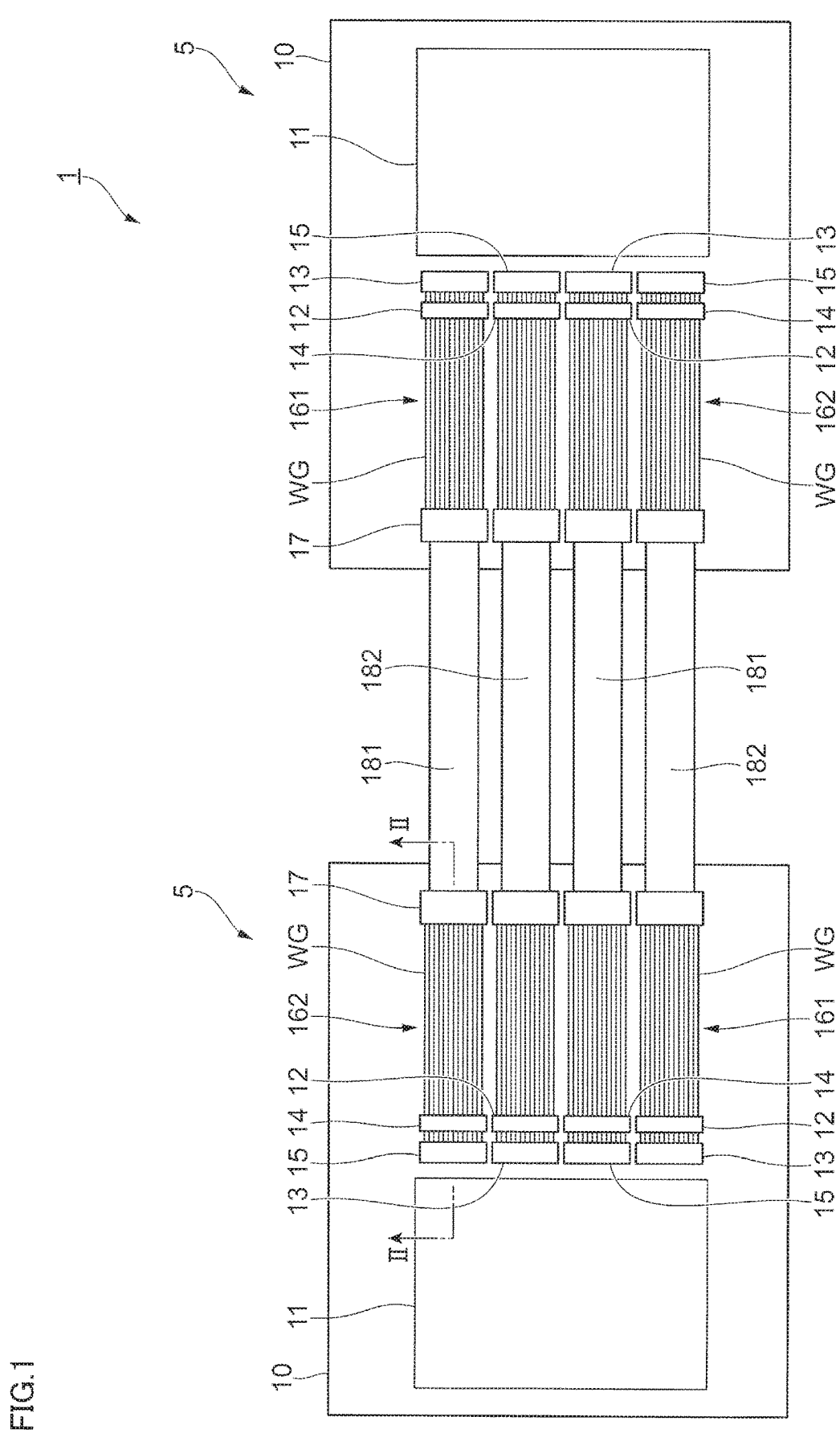
FIG. 1 is a top view of an optical communication system according to a first embodiment.

FIG. 1 is a top view of an optical communication system 1 according to a first embodiment. As shown in the figure, the optical communication system 1 may include two multi-chip modules (MCMs) 5. The MCM 5 may include a main substrate 10, a central processing unit (CPU) 11, vertical cavity surface emitting laser (VCSEL) chip arrays 12, laser diode driver (LDD) chips 13, photodiode (PD) chip arrays 14, trans-impedance amplifiers (TIA) chips 15, waveguide layers 161 and 162, and fiber connectors 17. Further, as shown in the figure, the optical communication system 1 may include fiber cables 181 and 182 each having several (e.g., 12 or 24) fiber cable cores.

The waveguide layer 161 may include multiple waveguide cores WG whose number matches the number of cores of the fiber cable 181 or 182. The VCSEL chip array 12 may include multiple VCSEL devices whose number matches the number of fiber cores (not shown) of the waveguide layer 161. The waveguide layer 162 may include multiple waveguide cores WG whose number matches the number of fiber cores (not shown) of the fiber cable 181 or 182. The PD chip array 14 may include multiple PD devices whose number matches the number of cores of the waveguide layer 162.

Figure 2:
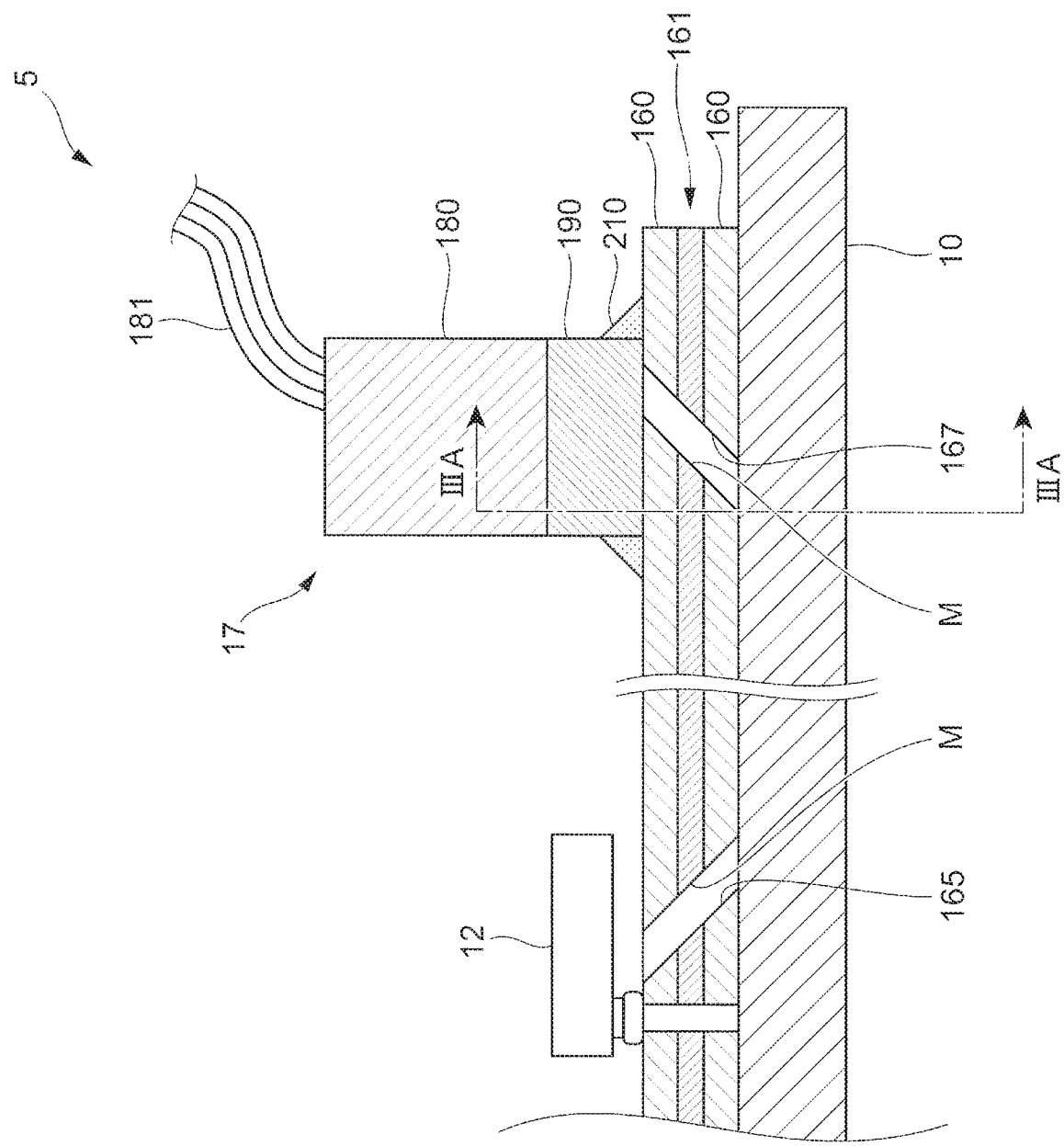
FIG. 2 is a side view of the MCM according to the first embodiment.

FIG. 2 is a side view of the MCM 5 according to the first embodiment. As shown in the figure, the waveguide layer 161 may be formed on the surface of the main substrate 10. The waveguide layer 161 may include the waveguide cores WG, a cladding layer 160 above the waveguide cores WG, and another cladding layer 160 below the waveguide cores WG. The waveguide layer 161 may be formed as a polymer waveguide.

The waveguide layer 161 may be provided with multiple mirror cavities 165. The mirror cavities 165 are provided at one end of the waveguide cores WG (left side in FIG. 2) and face the VCSEL chip array 12. Each mirror cavity 165 is provided on each waveguide core WG. In other words, the number of the mirror cavities 165 matches the number of the waveguide cores WG.

The waveguide layer 161 may also be provided with multiple mirror cavities 167. The mirror cavities 167 are provided at the other end of the waveguide cores WG (right side in FIG. 2) and face the fiber connector 17. Each mirror cavity 167 is provided on each waveguide core WG. In other words, the number of the mirror cavities 167 matches the number of the waveguide cores WG.

The mirror cavities 165 and 167 may be inclined at an angle of 45° to form reflective surfaces (mirrors M) on boundaries (interfaces) between the waveguide cores WG and the mirror cavities 165 or the mirror cavities 167. In the present embodiment, the boundaries may be provided without a metal coating, and the mirror cavities 165 and 167 may be filled with air (atmosphere). This configuration enables the mirrors M to reflect the light by total internal reflection (TIR). More specifically, the mirrors M of the mirror cavities 165 reflect the light from the VCSEL chip array 12 to the waveguide cores WG by total internal reflection. The mirrors M of the mirror cavities 167 reflect the light from the waveguide cores WG to the fiber connector 17 by total internal reflection.

Figure 3:
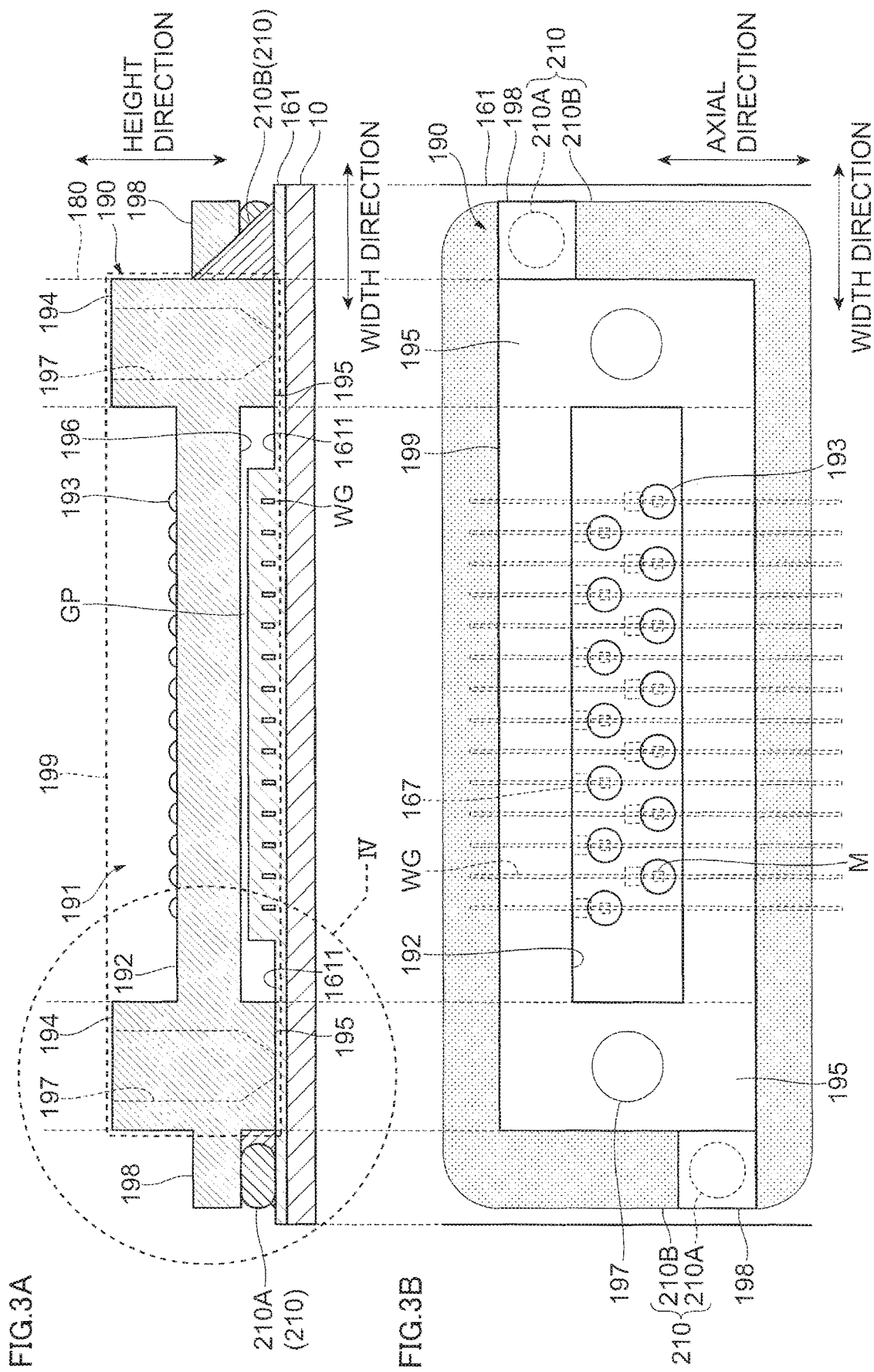
FIG. 3A is a schematic cross-sectional view taken along the line IIIA-IIIA in FIG. 2.
FIG. 3B is a top view of the substrate side component and the waveguide layer according to the first embodiment.

In some embodiments, the mirrors M of the mirror cavities 167 are provided in staggered positions in the waveguide cores WG to form two rows (refer to FIG. 3B).

The fiber connector 17 may include a fiber side component 180 and a substrate side component 190. The fiber side component 180 connected to the fiber cables 181 and 182 may be mounted on the substrate side component 190. The substrate side component 190 may be directly mounted on the waveguide layer 161 to receive the fiber side component 180.

The substrate side component 190 is glued onto the waveguide layer 161 using an adhesive 210. The adhesive 210 may be a photocurable material, such as an ultraviolet (UV) curing material (light-curing material) or a thermal curing material. The waveguide layer 161 is an example of the claimed substrate. The substrate side component 190 is an example of the claimed optical component. The microlens 193 is an example of the claimed lenses.

FIG. 3A is a schematic cross-sectional view taken along the line IIIA-IIIA in FIG. 2. FIG. 3B is a top view of the substrate side component 190 and the waveguide layer 161 according to the first embodiment.

As shown in FIGS. 3A and 3B, the substrate side component 190 may include a body 199 and wings 198 (described below). The substrate side component 190 may be formed as a polymer component. In the present embodiment, the substrate side component 190 may be configured as a single piece.

The body 199 may have a generally cuboid shape. The body 199 may include a substrate side microlens array 191, first support portions 194, second support portions 195, and alignment holes 197.

The microlens array 191 may include multiple microlenses 193. The microlens array 191 is arranged in two rows corresponding to the rows of the mirrors M of the mirror cavities 167. In the present embodiment, the body 199 may be provided with a top recess 192 having a generally cuboid shape on the top surface. The microlens array 191 is provided on the bottom of the top recess 192.

The substrate side component 190 may be positioned on the waveguide layer 161 so that each microlens 193 is aligned with the corresponding mirror M provided on each waveguide core WG. In some embodiments the fiber side component 180 may also include a fiber side microlens array. Each microlens 193 of the substrate side component 190 is aligned with each fiber side microlens. This configuration allows the light reflected at the mirror M to pass the microlens 193 of the substrate side component 190 and the corresponding microlens of the fiber side component 180.

The first support portions 194 are protruded portions on the top surface of the body 199. The first support portions 194 may be provided on both sides in the longitudinal direction of the body 199. The first support portions 194 support the fiber side component 180. In the present embodiment, the microlens array 191 is provided between the first support portions 194. In some embodiments the top recess 192 is provided between the first support portions 194.

The second support portions 195 are protruded portions on the bottom surface of the body 199. The second support portions 195 may be provided on both sides in the longitudinal direction of the body 199. The second support portions 195 may be mounted on the waveguide layer 161. Defined between the second support portions 195 is a bottom central area 196.

The bottom surface of the body 199, more specifically the bottom central area 196, faces the area of the upper surface of the waveguide layer 161 in which the mirror cavities 167 are provided. In other words, the substrate side component 190 may cover the mirror cavities 167.

The alignment holes 197 are through holes penetrating the body 199 from the top surface to the bottom surface of the body 199. In mounting the substrate side component 190 onto the waveguide layer 161, image recognition of the alignment holes 197 is conducted to detect a position where the substrate side component 190 is to be mounted.

In the following explanation, the direction along the axis of the waveguide core WG is called an axial direction. The direction perpendicular to the axial direction along the plane of the waveguide layer 161 is called a width direction. The direction vertically perpendicular to both of the axial direction and the width direction is called a height direction.

(Fixation Process)

The multi-chip module (MCM) 5 is an assembly fabricated by high density optical integration. Such high density optical integration has been a key to high speed, lower cost interconnection for, among others, high performance (HPC) systems and high-end servers in data centers. Integration of optical components demands care for alignment of the components, thus creating technical challenges toward high-throughput or low cost production. In some embodiments the high density optical integration may need an alignment accuracy of less than ±5 um in a few seconds of process time. Misalignment between the substrate side component 190 and the waveguide layer 161 may cause a signal loss of light passing the microlens 193 of the substrate side component 190.

Figure 4:
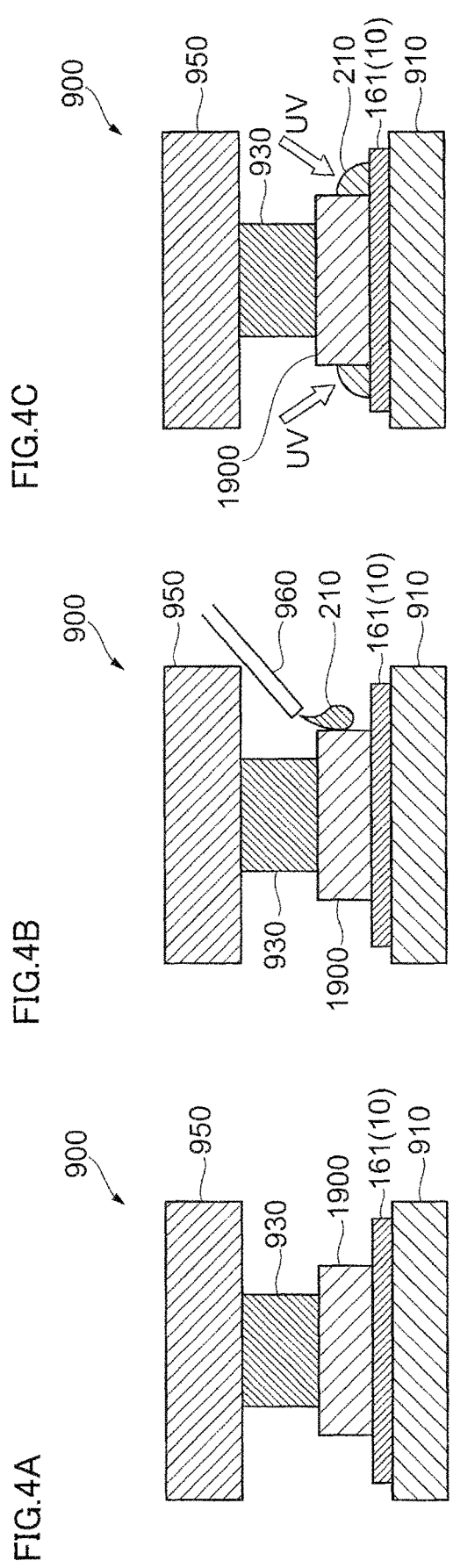
FIGS. 4A, 4B, and 4C show a process for fixing the substrate side component to the waveguide layer in an example.

FIGS. 4A, 4B, and 4C show a process for fixing the substrate side component 1900 to the waveguide layer 161 in an example. The substrate side component 1900, which are not provided with the wings 198 of the present embodiments, is fixed to the waveguide layer 161 in the following fixation process.

The fixation process may be conducted by a pick tool 900. The pick tool 900 may include a base 910, a pick head 930, a holder 950, and an adhesive dispenser 960. The base 910 supports the main substrate 10 provided with the waveguide layer 161. The pick head 930 picks the substrate side component 1900. The holder 950, such as a robot arm, holds and moves the pick head 930. The adhesive dispenser 960 dispenses the adhesive 210 in a fluidized state on the waveguide layer 161. The pick head 930 and the holder 950 are examples of the claimed moving unit.

As shown in FIG. 4A, in an initial state, the main substrate 10 provided with the waveguide layer 161 is placed on the base 910. In the first step, the holder 950 picks the substrate side component 1900 using the pick head 930 to mount the substrate side component 1900 on the waveguide layer 161.

As shown in FIG. 4B, in the second step, the adhesive dispenser 960 dispenses the adhesive 210 around all the sides of the substrate side component 1900. In the second step, the pick head 930 is holding the substrate side component 1900.

As shown in FIG. 4C, in the third step, the adhesive 210 is cured by UV irradiation so that the substrate side component 1900 is fixed to the waveguide layer 161. In the third step, the pick head 930 is holding the substrate side component 1900.

In the present example, the pick tool 900 is needed to dispense the adhesive 210 while holding the substrate side component 1900 in a certain position with the pick head 930. This will be a challenge due to space consideration. Further, the pick tool 900 is monopolized for a relatively long period for a single set of the substrate side component 1900 and the waveguide layer 161. This may increase production costs. If a thermal curing material is used as the adhesive 210 in this example, the pick tool 900 will be monopolized for a still longer period.

Figure 5:
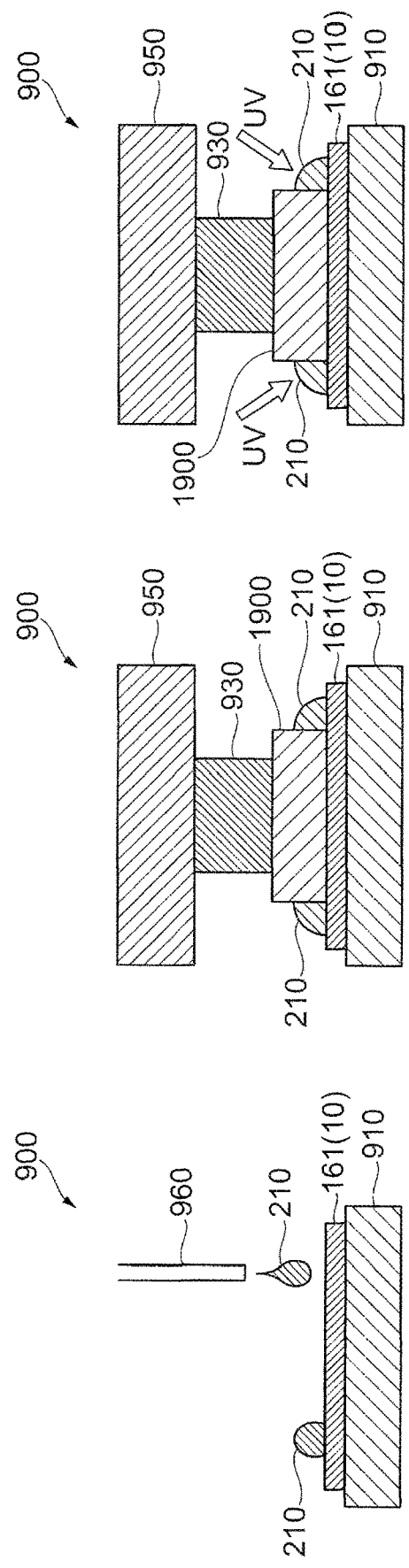
FIGS. 5A, 5B, and 5C show another process for fixing the substrate side component to the waveguide layer in another example.

FIGS. 5A, 5B, and 5C show another process for fixing the substrate side component 1900 to the waveguide layer 161 in another example.

As shown in FIG. 5A, in an initial state, the main substrate 10 provided with the waveguide layer 161 is placed on the base 910. In the first step, the adhesive dispenser 960 dispenses the adhesive 210 on the waveguide layer 161 along the circumference of an area where the substrate side component 1900 is to be mounted.

As shown in FIG. 5B, in the second step, the holder 950 picks the substrate side component 1900 using the pick head 930 to mount the substrate side component 1900 onto the waveguide layer 161. In this step, the bottom of the substrate side component 1900 pushes the adhesive 210 dispensed on the waveguide layer 161.

As shown in FIG. 5C, in the third step, the adhesive 210 is cured by UV irradiation so that the substrate side component 1900 is fixed to the waveguide layer 161. In the third step, the pick head 930 is holding the substrate side component 1900.

In the present example, the adhesive 210 is dispensed on the waveguide layer 161 before the placement of the substrate side component 1900 onto the waveguide layer 161, so that the substrate side component 1900 pushes the adhesive 210 from above. This causes the adhesive 210 to distribute through the gap GP (refer to FIG. 3A). The distributing adhesive 210 may flow into the mirror cavities 167. Such flow of the adhesive 210 into the mirror cavities 167 may decline the reflectivity at the mirrors M. To prevent the flow of the adhesive 210, a very strict control of the size of the gap GP or a very strict control of the quantity of adhesive may be needed in this example.

Further, the adhesive 210 below the substrate side component 1900 is needed to be irradiated with the UV light having transmitted the substrate side component 1900. This may influence a yield in the manufacturing process. Further, unevenness may occur in the degree of solidification of the adhesive 210 below the substrate side component 1900. This may also influence the yield in the manufacturing process.

In the present embodiments, on the contrary, the substrate side component 190 is provided with the wings 198 by which preliminary tacking prior to full assembly processes is enabled. This delivers precision alignment and fixation in one process, increasing both yield and throughput.

(Wing 198)

Figure 6:
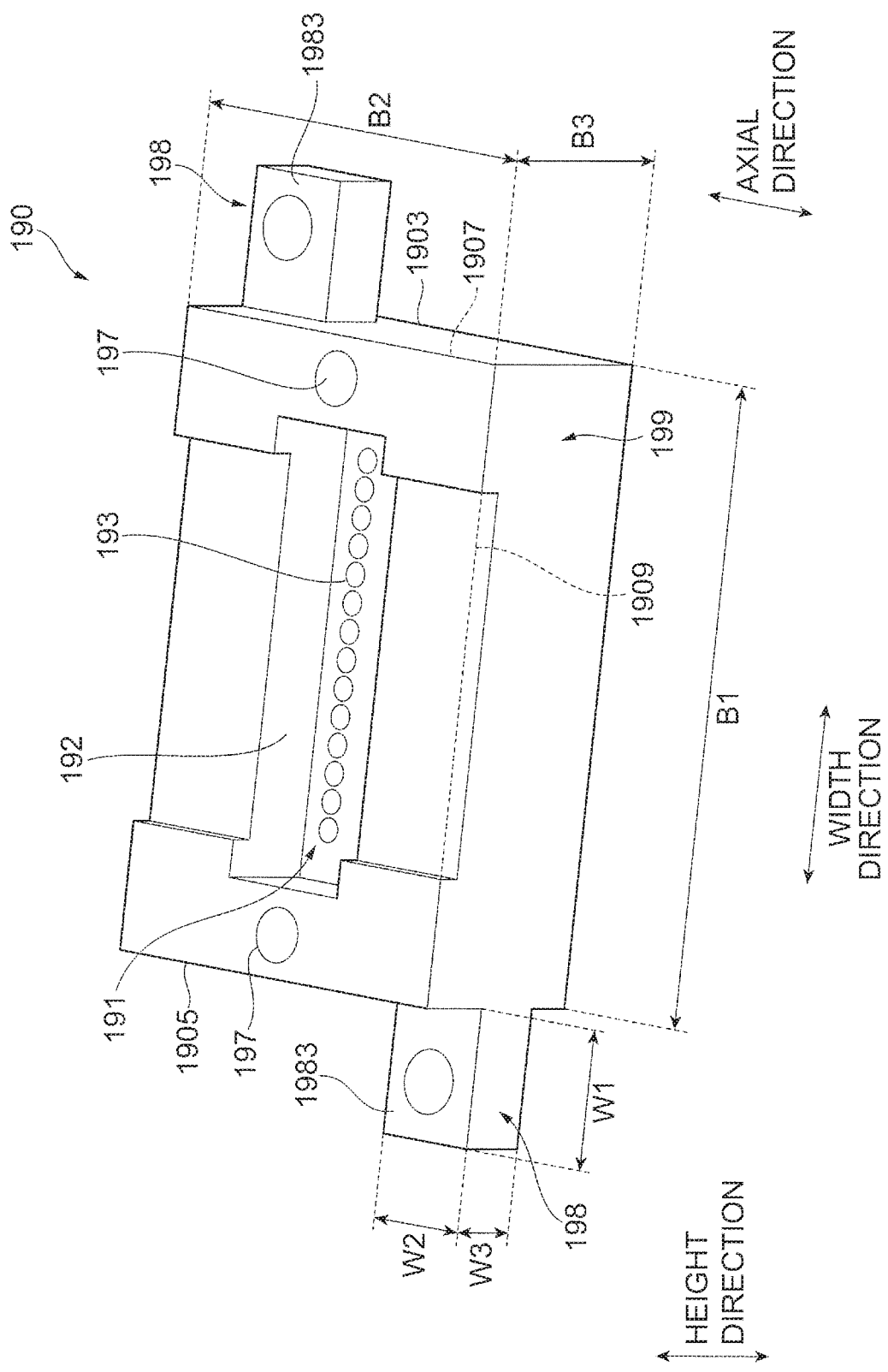
FIG. 6 is a perspective view of the substrate side component according to the first embodiment.
Figure 7:
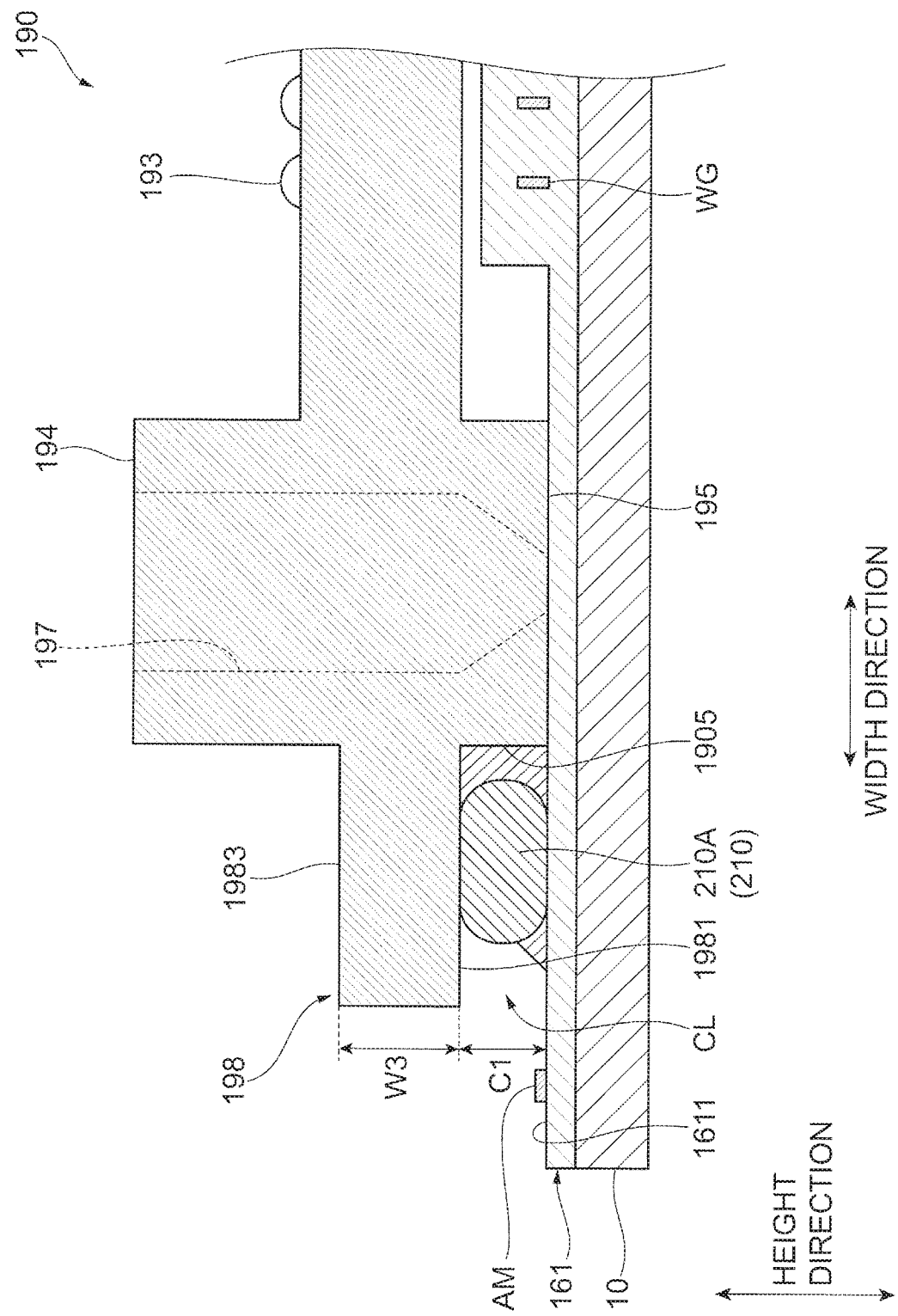
FIG. 7 is a partial cross-sectional view in a circle VII in FIG. 3A.

FIG. 6 is a perspective view of the substrate side component 190 according to the first embodiment. FIG. 7 is a partial cross-sectional view in a circle VII in FIG. 3A. Referring to FIGS. 6 and 7, the wings 198 will be explained in detail. The wing 198 is an example of the claimed protrusion.

As shown in FIG. 6, the wings 198 may be provided on respective sides in the longitudinal direction of the substrate side component 190. In the shown embodiment, the wings 198 are provided on respective sides of the body 199 in a polymer injection mold process to produce the substrate side component 190. In some embodiments the wings 198 are provided at positions facing each other across an area including the waveguide cores WG (refer to FIG. 3B).

As mentioned above, the body 199 has a generally cuboid shape. The body 199 has a first surface 1903 facing in one direction (right side in FIG. 6) along the width direction, and a second surface 1905 facing in the opposite direction (left side in FIG. 6) along the width direction. The body 199 has a rectangular shape viewed from the top. That is to say, the body 199 has short sides 1907 and long sides 1909 viewed from the top.

The wings 198 are protrusions on the first surface 1903 and the second surface 1905, namely on the short sides 1907 of the body 199. In the shown embodiment, the wings 198 are provided on diagonal corners of the body 199. More specifically, the wings 198 are provided at positions facing each other across the microlens array 191. The first surface 1903 is an example of the claimed side of the body.

The wings 198 may have the same shape. In the shown embodiment, the wings 198 are planar members. That is to say, the wings 198 have a generally rectangular (square) planar shape provided along the top surface 1611 (refer to FIG. 7) of the waveguide layer 161. Each wing 198 has a bottom surface 1981 and a top surface 1983. The bottom surface 1981 faces the top surface 1611 of the waveguide layer 161. The bottom surface 1981 is an example of the claimed adhesion surface. The top surface 1983 is an example of the claimed opposing surface.

Next, an explanation is given of the dimensions of the body 199 and the wing 198. In the shown embodiment, the body 199 has a width of 6 mm (refer to length B1), a depth of 5 mm (refer to length B2), and a height of 1 mm (refer to length B3). The wing 198 has a width of 1 mm (refer to length W1), a depth of 1 mm (refer to length W2), and a height (thickness) of 0.5 mm (refer to length W3).

The thickness of the wing 198 is smaller than the height of the body 199. More specifically, the thickness of the wing 198 may be equal to or smaller than half the thickness of the body 199. The thickness of the wing 198 is chosen to offer sufficient mechanical strength, manufacturability using a mold, and sufficient light transmissibility for quick UV tacking (described below).

As shown in FIG. 7, each wing 198 is provided on the body 199 at a position where a clearance CL is formed between the bottom surface 1981 of the wing 198 and the top surface 1611 of the waveguide layer 161. The clearance CL is smaller than the thickness of the wing 198. More specifically, the clearance CL may be equal to or smaller than half the thickness of the wing 198. In the shown embodiment, the clearance CL may be around 0.07 mm (refer to length Cl in FIG. 7).

The clearance CL is chosen based on an adhesion area size (i.e. an area of the bottom surface 1981), a height of a droplet of the adhesive 210 (described below), and a height of waveguide structures such as alignment markers AM. In some embodiments the alignment marker AM is a protruding mark for machine vision provided on the waveguide layer 161. Photolithography may be used to pattern the waveguide cores WG and to form the alignment markers AM on the top of the waveguide layer 161. The clearance CL may be larger than the height of the alignment markers AM, preventing the wings 198 from contacting with the alignment markers AM.

The wing 198 offers a gluing area on the exterior of the body 199, preventing the adhesive 210 from interfering with optical paths and the microlenses 193. In the shown embodiment, the bottom surface 1981 is glued to the top surface 1611 of the waveguide layer 161 using the adhesive 210, more specifically a tacking adhesive 210A.

The clearance CL can be regarded as a space for accommodating the tacking adhesive 210A. The space prevents the tacking adhesive 210A from flowing into the mirror cavities 167. Further, parts of the first surface 1903 or the second surface 1905 facing the space rise from the top surface 1611 of the waveguide layer 161. In other words, the parts may be perpendicular to the top surface 1611 of the waveguide layer 161. This also enables the first surface 1903 and the second surface 1905 to prevent the tacking adhesive 210A from flowing into the mirror cavities 167. Further, the space is opened except sides of the bottom surface 1981 of the wing 198, the top surface 1611 of the waveguide layer 161, and the first surface 1903 or the second surface 1905 of the body 199. This enables the tacking adhesive 210A to flow in a direction other than toward the mirror cavities 167.

The tacking adhesive 210A is cured by UV light irradiated from above the wings 198. Here, in the shown embodiment, the top surface 1983 is a flat surface. This enables the whole tacking adhesive 210A to be irradiated with UV light of uniform intensity. Further, the relatively small thickness of the wing 198 may increase the UV light intensity on the tacking adhesive 210A. In some embodiments the wings 198 (the substrate side component 190) may be made of a transparent material transmitting the UV light.

In some embodiments the wings 198 are provided on the exterior of the body 199, so that the size or the shape of the wings 198 can be designed independently of the size or the shape of the body 199.

(Detailed Fixation Process)

FIGS. 8A, 8B, 8C, 8D, and 8E show a process for fixing the substrate side component 190 to the waveguide layer 161 in the first embodiment. Referring to FIGS. 8A to 8E, the fixation process in the first embodiment will be explained in detail.

As shown in FIG. 8A, in an initial state, the main substrate 10 provided with the waveguide layer 161 is placed on the base 910. In the first step, the adhesive dispenser 960 dispenses the adhesive 210 on the waveguide layer 161. In this step, the tacking adhesive 210A that is UV curable is dispensed as droplets on areas where the wings 198 are to be mounted. That is to say, the tacking adhesive 210A is applied on two points arranged opposite to each other across an area where the substrate side component 190 is to be mounted (refer to FIG. 3B).

As shown in FIG. 8B, in the second step, the holder 950 picks the substrate side component 190 using the pick head 930 to mount the substrate side component 190 on the waveguide layer 161. In this step, the wings 198 are mounted on the areas where the tacking adhesive 210A has been dispensed. That is to say, the bottom surfaces 1981 of the wings 198 push the tacking adhesive 210A. In the second step, the pick head 930 is holding the substrate side component 190.

As shown in FIG. 8C, in the third step, the tacking adhesive 210A is cured by UV irradiation so that the substrate side component 190 is tacked to the waveguide layer 161. In some embodiments the UV light is irradiated at 400 mW/cm$^2$ for 30 seconds. In the third step, the pick head 930 is holding the substrate side component 190.

As shown in FIG. 8D, in the fourth step, the holder 950 picks the substrate side component 190 tacked to the waveguide layer 161 from the base 910 to place the substrate side component 190 and the waveguide layer 161 on a curing base 970. In other words, the holder 950 transfers them from the base 910 to the curing base 970. In this step, the tacking adhesive 210A is further cured by UV irradiation to finish a UV cure process. In some embodiments the UV light is irradiated at 1500 mW/cm$^2$ for 2 minutes. In the fourth step, the pick head 930 is not needed to hold the substrate side component 190 because the substrate side component 190 have been tacked to the waveguide layer 161 in the third step (refer to FIG. 8C).

As shown in FIG. 8E, in the fifth step, the holder 950 transfers the substrate side component 190 and the waveguide layer 161 from the curing base 970 to a heating plate 990. In this step, the adhesive dispenser 1960 dispenses a side filling adhesive 210B that is thermally curable or UV curable. In some embodiments the side filling adhesive 210B may not flow under the substrate side component 190 to remain around the periphery of the waveguide layer 161. The side filling adhesive 210B is then cured by the heating plate 990. That is to say, thermal tacking is conducted in the fifth step. Further, in the fifth step, the pick head 930 is not needed to hold the substrate side component 190. The heating plate 990 is an example of the claimed support base.

In this way, the substrate side component 190 is attached to the waveguide layer 161 in an automated attach process. In the process, the substrate side component 190 may be firstly tacked to the waveguide layer 161 in the third step using the wings 198 and the tacking adhesive 210A. This shortens the time in which the substrate side component 190 monopolize the pick tool 900.

In the shown embodiment, the substrate side component 190 may be fixed to the waveguide layer 161 by a combination of the tacking adhesive 210A and the side filling adhesive 210B. Further, as shown in FIG. 3B, each wing 198 is provided between the side filling adhesive 210B in the axial direction. The side filling adhesive 210B may prevent the wing 198 from moving in the axial direction. The tacking adhesive 210A is an example of the claimed adhesive. The side filling adhesive 210B is an example of the claimed another adhesive.

(Arrangement of Substrate Side Components 190)

FIG. 9 is a top view of the substrate side components 190 arranged on the main substrate 10 according to the first embodiment.

As shown in FIG. 9, multiple substrate side components 190 are arranged on the main substrate 10. In the shown embodiment, four substrate side components 190 are arranged along the width direction. Each substrate side component 190 is provided with the wings 198 on diagonal corners of the body 199. In other words, the wings 198 are provided in asymmetric positions. This allows for arranging the wings 198 in staggered positions. This arrangement can reduce a space 51 between the bodies 199 to at most the width of the wing 198 (refer to length W1). In other words, the asymmetric arrangement allows multiple substrate side components 190 to be placed densely without interference between wings 198 of adjacent substrate side components 190.

Alternative Embodiments

Figure 10A:
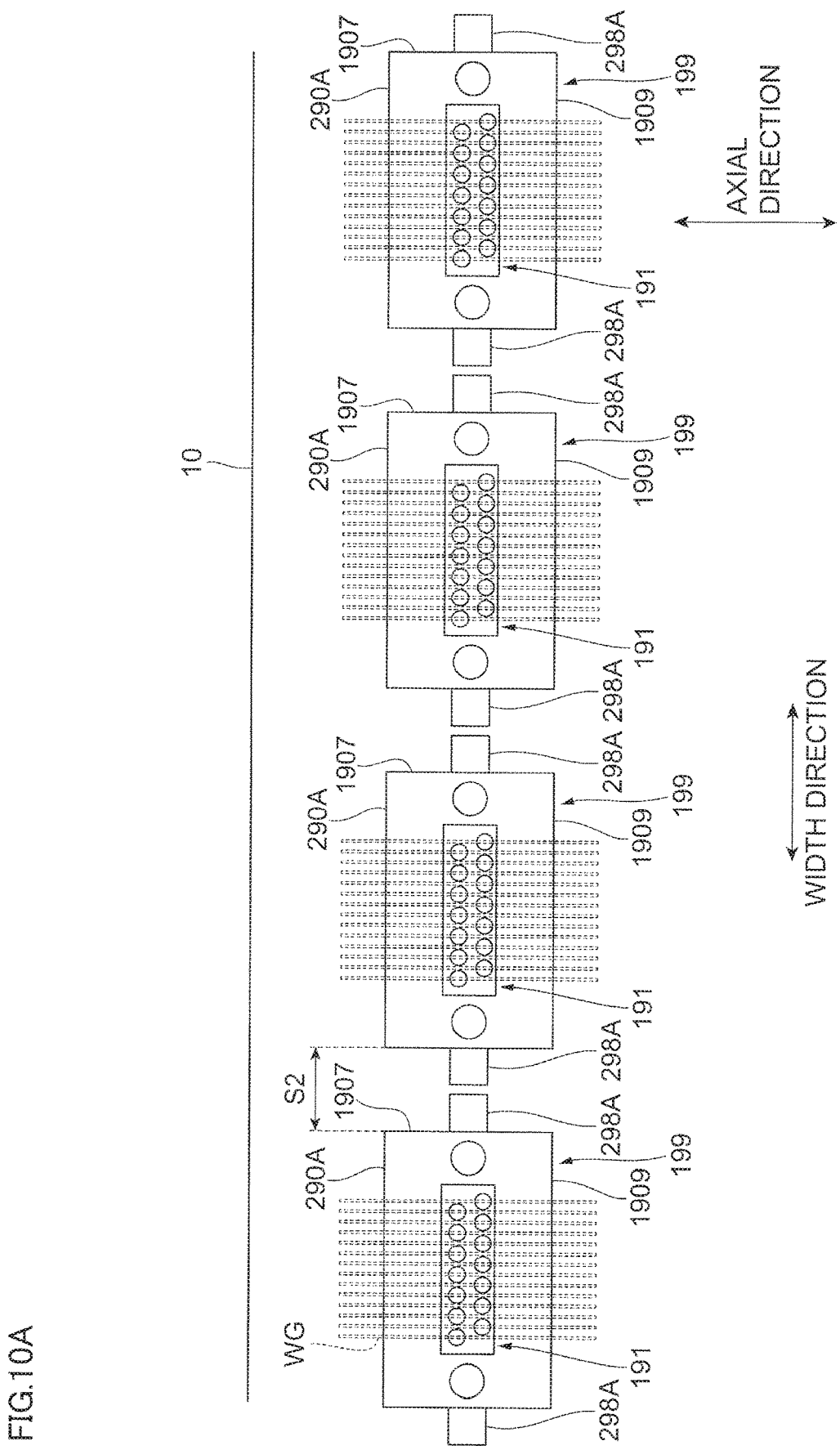
FIG. 10A is a top view of the substrate side components arranged on the main substrate according to a second embodiment.
Figure 10B:
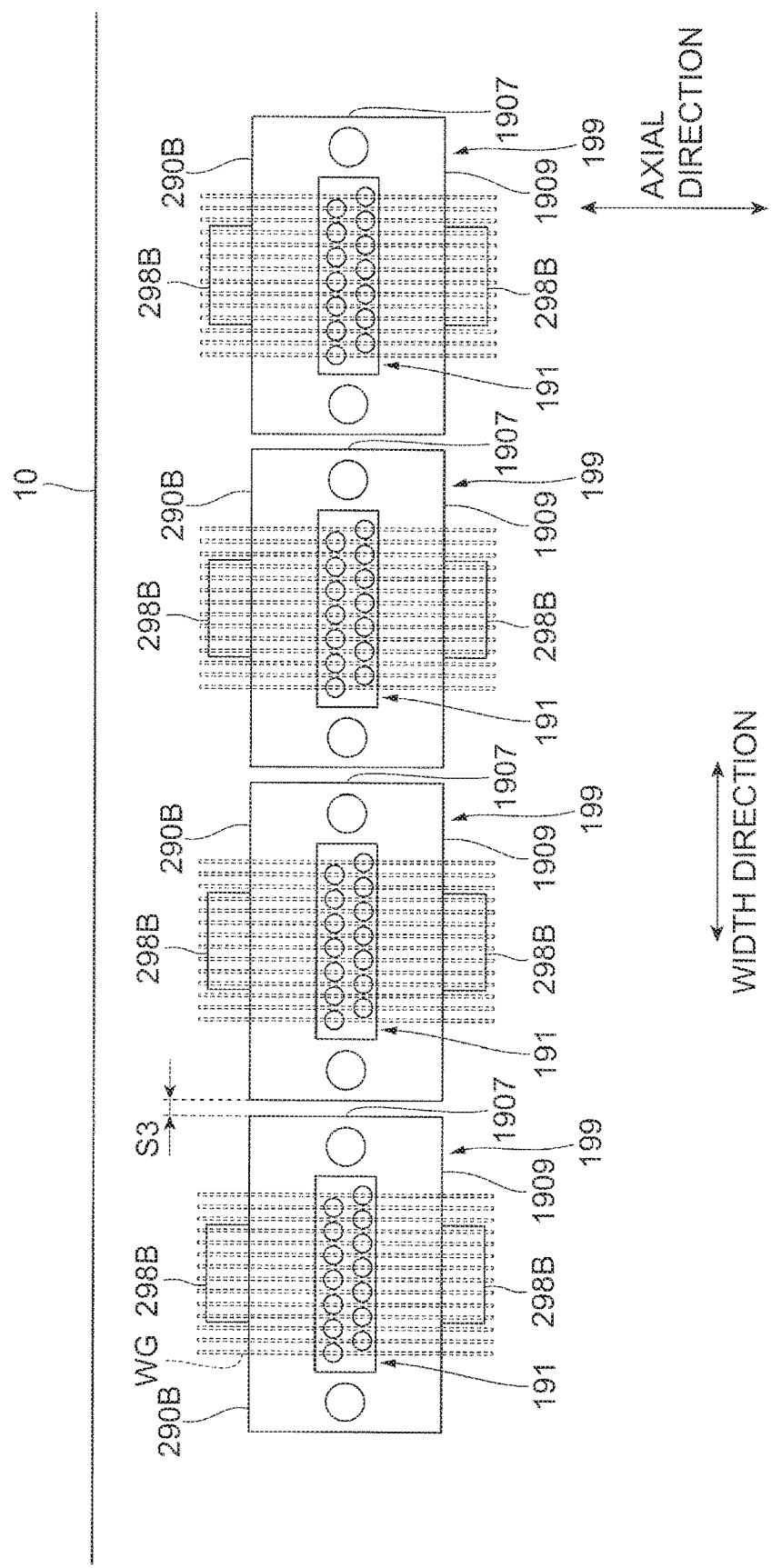
FIG. 10B is a top view of the substrate side components arranged on the main substrate according to a third embodiment.

FIG. 10A is a top view of the substrate side components 290A arranged on the main substrate 10 according to a second embodiment. FIG. 10B is a top view of the substrate side components 290B arranged on the main substrate 10 according to a third embodiment. In FIGS. 10A and 10B, the same components as those of the first embodiment shown in FIGS. 1 to 3 and 6 to 9 are denoted by the same reference numerals, and the detailed explanation thereof will be omitted.

Referring to FIG. 10A, an explanation is given of the substrate side component 290A according to the second embodiment. In the above first embodiment, the substrate side component 190 is provided with the wings 198 installed on the exterior of the body 199 in asymmetric arrangement. The arrangement of the wings 198 is not limited to this. In some embodiments, as shown in FIG. 10A, the substrate side component 290A is provided with the wings 298A installed on the exterior of the body 199 in symmetric arrangement. This arrangement needs a space S2 between the bodies 199 in the width direction, which is equal to or larger than widths of at least two wings 298A.

Referring to FIG. 10B, an explanation is given of the substrate side component 290B according to the third embodiment. As shown in FIG. 10B, the substrate side component 290B is provided with the wings 298B installed on its long sides 1909 in symmetric arrangement. This arrangement can reduce a space S3 between the bodies 199 in the width direction. In this arrangement, a space is needed between the body 199 and adjacent components to avoid interference between the wings 298B and the other components.

(Modifications)

Figure 11A:
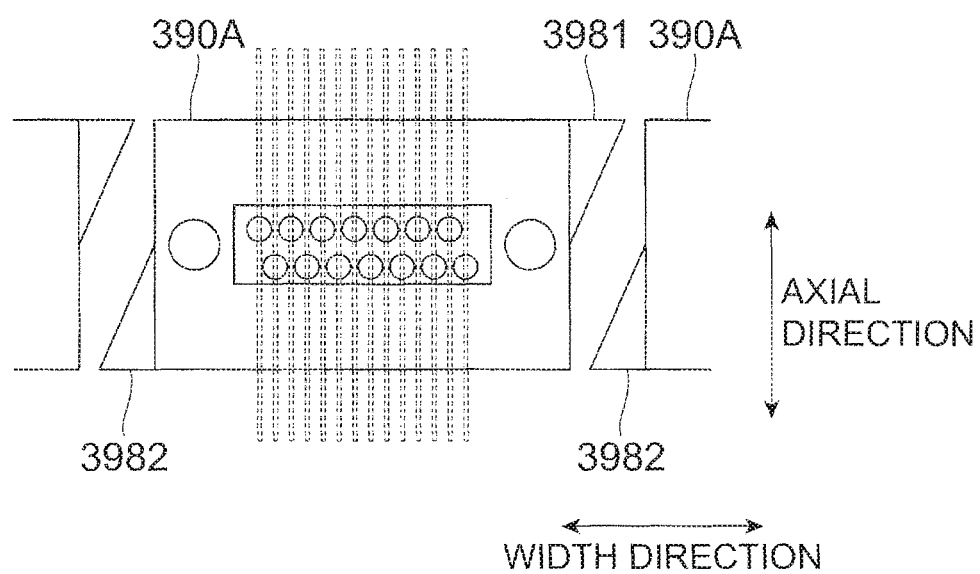
FIGS. 11A, 11B, and 11C are top views of the substrate side component.
Figure 11B:
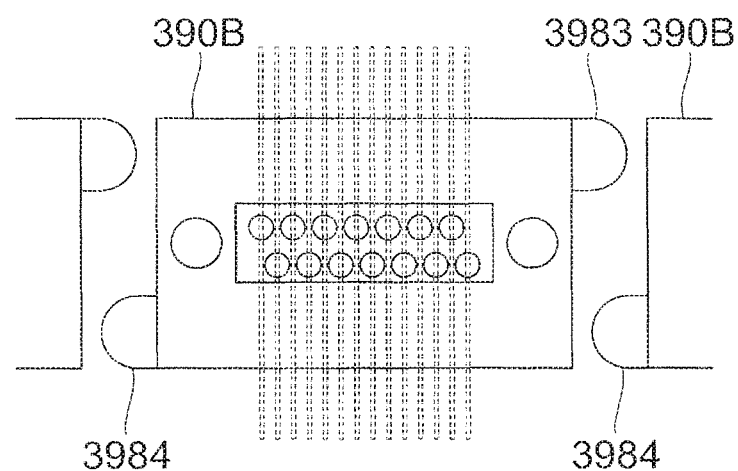
Figure 11C:
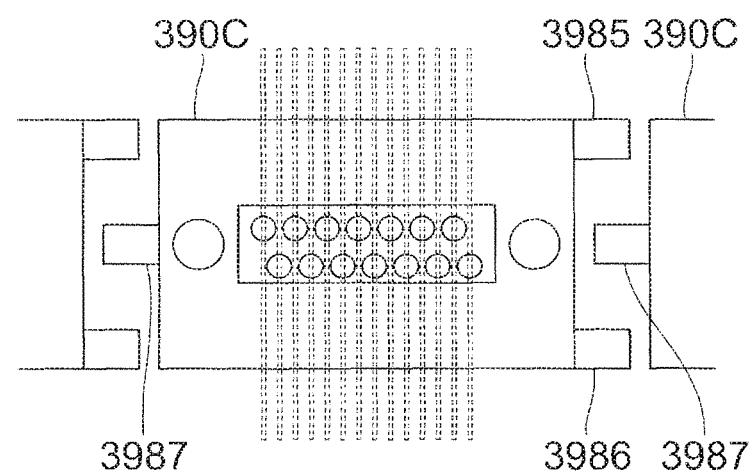

FIGS. 11A, 11B, and 11C are top views of the substrate side components 390A, 390B, and 390C. Referring to FIGS. 11A to 11C, an explanation is given of modifications of the substrate side component 190. In the above embodiments, the wings 198, 298A, and 298B have the generally rectangular planar shape. The shape of the wings 198, 298A, and 298B is not limited to this; the shape of the wings 198, 298A, and 298B can be determined based on application requirements. The wings 198, 298A, and 298B can be a hemisphere shape or a columnar shape, such as a cylinder shape or a prism shape.

In some embodiments, as shown in FIG. 11A, the wings 3981 and 3982 provided on the substrate side component 390A may have a generally triangle planar shape. The wings 3981 and 3982 may be oppositely oriented.

Further, as shown in FIG. 11B, the wings 3983 and 3984 provided on the substrate side component 390B may have a generally semicircle planar shape. In other words, the wings 198, 298A, and 298B may have rounded corners.

Further, a number of the wings 198, 298A, and 298B provided on the single body 199 is not limited to two. As shown in FIG. 11C, three wings 3985, 3986, and 3987 may be provided on the single body 199 of the substrate side component 390C. Further, the numbers of the wings 198, 298A, and 298B provided on opposite sides of the body 199 are not needs to be equal to each other. In some embodiments, as shown in FIG. 11C, two wings 3985 and 3986 may be provided on one side of the body 199, and one wing 3987 may be provided on the other side of the body 199. Alternatively, only one wing 198 may be provided on the single body 199.

Further, in the above explanation referring to FIGS. 8A to 8E, the tacking adhesive 210A is dispensed under the wings 198 for tacking to the waveguide layer 161. The wings 198 can be tacked to the waveguide layer 161 by an adhesive 210 dispensed around the sides of the wings 198 instead of the tacking adhesive 210A.

Figure 12A:
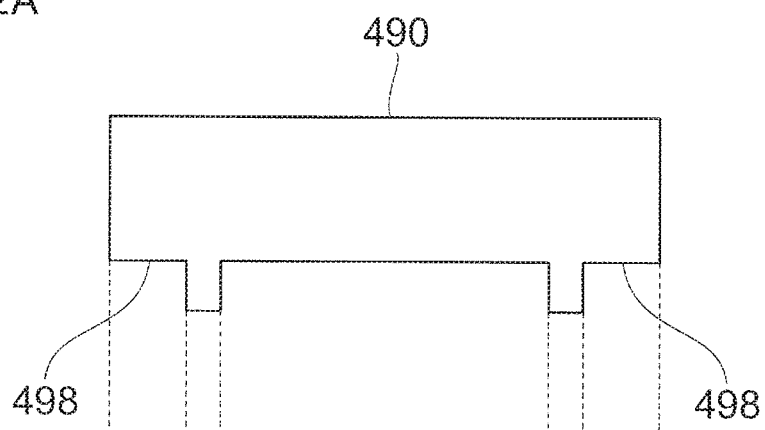
FIGS. 12A and 12B are a side view and a top view of the substrate side components according to a modification.
Figure 12B:
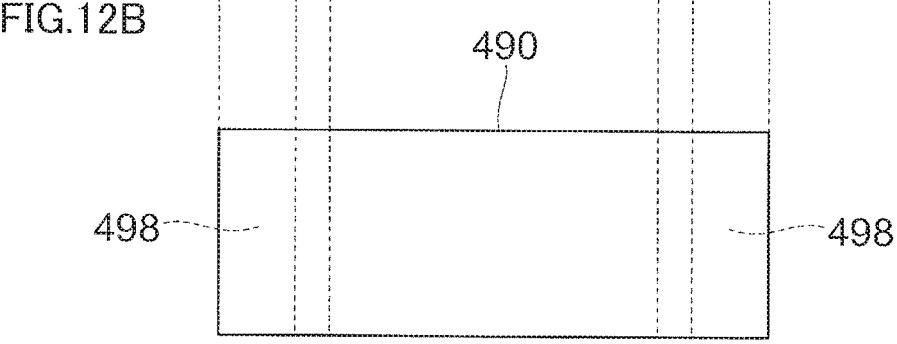

FIGS. 12A and 12B are a side view and a top view of the substrate side components 490 according to still another modification. In the above embodiments, the substrate side components 190, 290A, and 290B have the wings 198, 298A, and 298B, respectively. However, the substrate side components 190, 290A, and 290B may have no wings as long as the clearance CL (refer to FIG. 7) is formed between the bottom surface of the substrate side component 190, 290A, or 290B and the top surface 1611 of the waveguide layer 161 on at least one side of the substrate side component 190, 290A, or 290B.

In some embodiments, as shown in FIGS. 12A and 12B, a substrate side component 490 is provided with recessed areas 498 on both sides in the longitudinal direction of the bottom surface of the substrate side component 490. The recessed areas 498 enable to form the clearance CL for accommodating the tacking adhesive 210A (refer to FIG. 7). The recessed areas 498 are an example of the claimed recesses.

Figure 13:
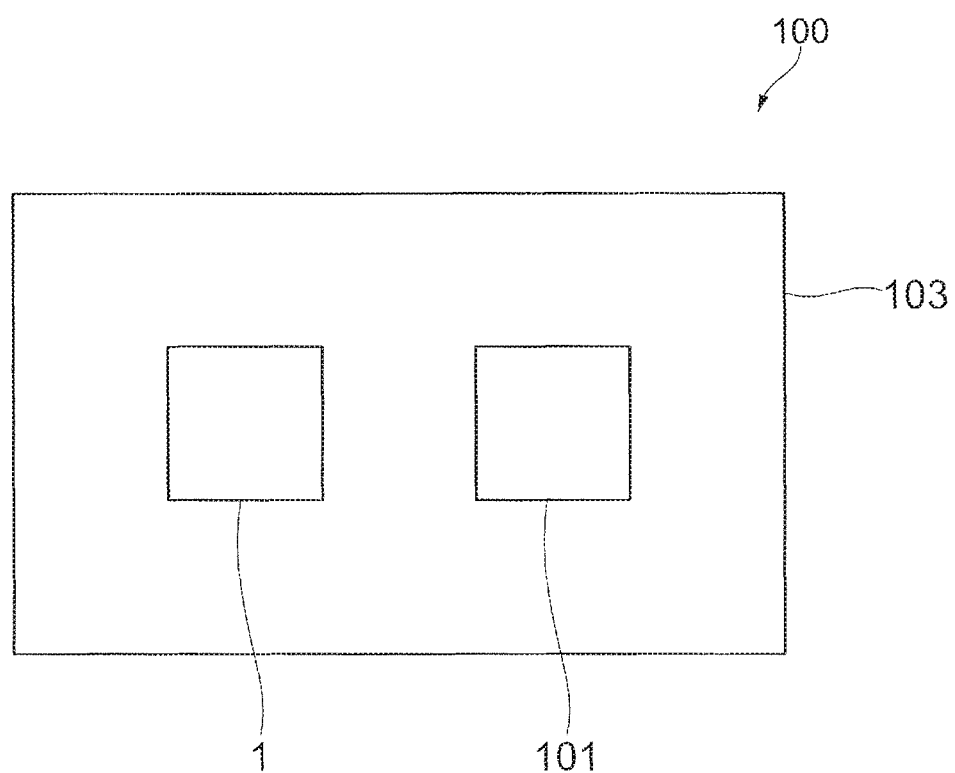
FIG. 13 is a schematic view of an apparatus provided with the optical communication system.

FIG. 13 is a schematic view of an apparatus 100 provided with the optical communication system 1.

The above mentioned optical communication system 1 may be provided on an apparatus 100. The apparatus 100 may be any device, such as high performance (HPC) systems, high-end servers, computers, or cars. As shown in the figure, the apparatus 100 may include an operating unit 101, e.g., a display or a motor, and a device body 103. The operating unit 101 may operate based on signals from the above mentioned optical communication system 1. The optical communication system 1 and the operating unit 101 may be mounted on the device body 103. That is to say, in a fabricating process of the apparatus 100, the substrate side component 190 fixed to the waveguide layer 161 is mounted on the device body 103. The optical communication system 1 is an example of the claimed optical device. The apparatus 100 is an example of the claimed device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An optical device comprising:
    a substrate including a plurality of waveguide cores, the plurality of waveguide cores allowing light to pass through the plurality of waveguide cores; and
    an optical component provided on the substrate, the optical component including a plurality of lenses, each of the plurality of lenses transmitting light passing through a corresponding one of the plurality of waveguide cores on the substrate, wherein
    the optical component comprises a body and a protrusion, the body being provided with the plurality of lenses, the protrusion being protruded from a side of the body, and
    the protrusion being fixed to the substrate with an adhesive.

2. The optical device of claim 1, wherein the protrusion comprises an adhesion surface facing a top surface of the substrate, the adhesion surface being fixed to the substrate with the adhesive bonding the adhesion surface of the protrusion and the top surface of the substrate.

3. The optical device of claim 2, wherein a clearance is formed between the adhesion surface of the protrusion and the top surface of the substrate, and
    the clearance is smaller than a thickness of the protrusion.

4. The optical device of claim 1, wherein the protrusion comprises an opposing surface provided on a side of the protrusion opposite from the adhesion surface.

5. The optical device of claim 1, wherein the protrusion is a planar member having a planar shape, the planar member being provided along the top surface of the substrate.

6. The optical device of claim 1, wherein the optical component is provided with a plurality of the protrusions, the plurality of the protrusions being provided at positions facing each other across the plurality of lenses.

7. The optical device of claim 1, wherein the optical component is provided with a plurality of the protrusions, the plurality of the protrusions being provided at positions facing each other across an area including the plurality of waveguide cores.

8. The optical device of claim 7, comprising a plurality of the optical components, the plurality of the optical components being arranged on the substrate along a direction perpendicular to a direction along the plurality of waveguide cores.

9. The optical device of claim 8, wherein the plurality of the protrusions are provided at different positions in the direction along the plurality of waveguide cores.

10. The optical device of claim 1, wherein the optical component is fixed to the substrate with another adhesive provided along the side of the body, the another adhesive bonding the side of the body and the top surface of the substrate.

11. The optical device of claim 10, wherein the another adhesive bonds a side of the protrusion and the top surface of the substrate.

12. The optical device of claim 11, wherein the adhesive comprises a light-curing material, and
    the another adhesive comprises a thermally curable material or an UV curable material.

13. The optical device of claim 1, wherein a thickness of the protrusion is less than half a thickness of the body.

14. An optical device comprising:
    a substrate including a plurality of waveguide cores, the plurality of waveguide cores allowing light to pass through the plurality of waveguide cores; and
    an optical component provided on the substrate, the optical component including a plurality of lenses, each of the plurality of lenses transmitting light passing through a corresponding one of the plurality of waveguide cores on the substrate, wherein
    the optical component comprises a surface facing the substrate and recesses provided on the surface, the recesses facing each other across the plurality of lenses, and
    the optical component being fixed to the substrate by adhesives accommodated in the recesses.

15. A device comprising an optical device and an operating unit operating based on a signal from the optical device, the optical device comprising:
    a substrate including a plurality of waveguide cores, the plurality of waveguide cores allowing light to pass through the plurality of waveguide cores; and
    an optical component provided on the substrate, the optical component including a plurality of lenses, each of the plurality of lenses transmitting light passing through a corresponding one of the plurality of waveguide cores on the substrate, wherein
    the optical component comprises a body and a protrusion, the body being provided with the plurality of lenses, the protrusion being protruded from a side of the body, and
    the protrusion being fixed to the substrate with an adhesive.

16. A method for fabricating an optical device, the method comprising:
    forming a substrate and an optical component, the substrate including a plurality of waveguide cores, the plurality of waveguide cores allowing light to pass through the plurality of waveguide cores, the optical component being provided on the substrate, the optical component including a plurality of lenses, each of the plurality of lenses transmitting light passing through a corresponding one of the plurality of waveguide cores on the substrate, the optical component comprising a body and a protrusion, the body being provided with the plurality of lenses, the protrusion being protruded from a side of the body; and
    fixing the protrusion to the substrate with an adhesive.

17. The method for fabricating the optical device of claim 16, further comprising fixing the optical component to the top surface of the substrate to which the protrusion of the optical component has been fixed.

18. The method for fabricating the optical device of claim 16, further comprising:

dispensing the adhesive on an area of the top surface of the substrate where the protrusion is to be mounted; and pushing the protrusion to the adhesive dispensed on the area of the top surface of the substrate.

19. The method for fabricating the optical device of claim 16, wherein the protrusion comprises an adhesion surface facing the top surface of the substrate, and the adhesion surface of the protrusion is pushed to the adhesive dispensed on the area of the top surface of the substrate.

20. The method for fabricating the optical device of claim 19, wherein the adhesive is cured by light irradiated through an opposing surface on a side of the protrusion facing the adhesion area, the opposing surface comprising a flat surface.

21. The method for fabricating the optical device of claim 20, wherein a moving unit pushes the protrusion to the adhesive dispensed on the area of the top surface of the substrate, the moving unit holding the optical component to move the optical component, and the moving unit holds the optical component to define a position of the optical component on the substrate while the adhesive is cured by the light irradiated through the opposing surface.

22. The method for fabricating the optical device of claim 19, further comprising:

moving the optical component and the substrate to a support base, the optical component having been fixed to the substrate, the support base supporting the optical component and the substrate; and fixing the optical component further to the substrate with another adhesive dispensed on the optical component and the substrate supported by the support base.

23. The method for fabricating the optical device of claim 22, wherein the another adhesive bonds a side of the protrusion and the top surface of the substrate.

24. The method for fabricating the optical device of claim 22, wherein the adhesive comprises a light-curing material, and the another adhesive comprises a thermally curable material or an UV curable material.

25. A method for fabricating a device, the method comprising:

forming a substrate, an optical component and a device body, the substrate including a plurality of waveguide cores, the plurality of waveguide cores allowing light to pass through the plurality of waveguide cores, the optical component being provided on the substrate, the optical component including a plurality of lenses, each of the plurality of lenses transmitting light passing through a corresponding one of the plurality of waveguide cores on the substrate, the optical component comprising a body and a protrusion, the body being provided with the plurality of lenses, the protrusion being protruded from a side of the body;

fixing the protrusion to the substrate with an adhesive; and mounting the optical component fixed to the substrate to the device body.

* * * * *